US012714650B2

(12) United States Patent
Bilton et al.

(10) Patent No.: US 12,714,650 B2
(45) Date of Patent: Aug. 25, 2026

(54) NIPPLE AND NIPPLE ASSEMBLY

(71) Applicant: Mayborn (UK) Limited, Newcastle Upon Tyne (GB)

(72) Inventors: Simon Lewis Bilton, New Castle Upon Tyne (GB); Grace McAlpine Kane, Newcastle Upon Tyne (GB); Matthew Scott Kettyle, Newcastle Upon Tyne (GB); Blake John Parkinson, Newcastle Upon Tyne (GB); Nicholas Cudworth, Newcastle Upon Tyne (GB)

(73) Assignee: Mayborn (UK) Limited, Newcastle Upon Tyne (GB)

( * ) Notice: Subject to any disclaimer, the term of this patent is extended or adjusted under 35 U.S.C. 154(b) by 44 days.

(21) Appl. No.: 18/708,484

(22) PCT Filed: Nov. 11, 2022

(86) PCT No.: PCT/GB2022/052863
§ 371 (c)(1),
(2) Date: May 8, 2024

(87) PCT Pub. No.: WO2023/084232
PCT Pub. Date: May 19, 2023

(65) Prior Publication Data

US 2025/0000746 A1 Jan. 2, 2025

(30) Foreign Application Priority Data

Nov. 12, 2021 (GB) ..................................... 2116379

(51) Int. Cl.
*A61J 11/00* (2006.01)
*A61J 11/04* (2006.01)
*A61J 17/00* (2006.01)

(52) U.S. Cl.
CPC ............ *A61J 11/005* (2013.01); *A61J 11/045* (2013.01); *A61J 17/001* (2015.05)

(58) Field of Classification Search
CPC ...... A61J 11/005; A61J 11/045; A61J 17/001; A61J 11/006; A61J 11/0065; A61J 11/0035; A61J 11/02; A61J 17/10
See application file for complete search history.

(56) References Cited

U.S. PATENT DOCUMENTS 1,620,329 A 3/1927 Donaldson
3,145,867 A 8/1964 Roberts
(Continued)

FOREIGN PATENT DOCUMENTS

CN 1261089 C 6/2006
CN 2877685 Y 3/2007
(Continued)

OTHER PUBLICATIONS

International Preliminary Report on Patentability in International Appln. No. PCT/GB2016/052640, mailed Mar. 15, 2018, 10 pages.
(Continued)

*Primary Examiner* — Shawn M Braden
(74) *Attorney, Agent, or Firm* — Fish & Richardson P.C.

(57) ABSTRACT

A nipple or teat, particularly a nipple for attachment to a container. The nipple comprises a breast portion having a central region, and a latch portion extending from the breast portion, the latch portion comprising a teat portion and an areola portion. The latch portion is radially offset from the central region of the breast portion and includes an outer wall. The outer wall of the latch portion includes a first region having a first wall thickness and a second region having a second wall thickness, wherein the second wall thickness is less than the first wall thickness. A nipple
(Continued)

assembly, feeding assembly and comforter assembly, each including the nipple or teat, are also disclosed.

23 Claims, 4 Drawing Sheets

(56) References Cited

U.S. PATENT DOCUMENTS

| | | | | |
|---|---|---|---|---|
| 4,613,050 | A | 9/1986 | Atkin et al. | |
| 4,834,099 | A * | 5/1989 | Schrooten | A61J 11/004<br>215/11.1 |
| 6,253,935 | B1 | 7/2001 | Fletcher | |
| 7,556,172 | B2 | 7/2009 | Lane | |
| D617,465 | S | 6/2010 | Hakim et al. | |
| D634,439 | S | 3/2011 | Hakim et al. | |
| 8,011,521 | B2 | 9/2011 | Clark | |
| 8,215,504 | B2 | 7/2012 | Marr | |
| 8,777,028 | B2 | 7/2014 | Sakulsacha | |
| 10,869,814 | B2 | 12/2020 | Cudworth | |
| 11,951,075 | B2 * | 4/2024 | Wagenknecht | A61J 11/008 |
| 2004/0230017 | A1 | 11/2004 | Kerns et al. | |
| 2004/0256345 | A1 | 12/2004 | Lundquist | |
| 2006/0037927 | A1 | 2/2006 | Williams | |
| 2008/0210655 | A1 | 9/2008 | Rees | |
| 2009/0039046 | A1 | 2/2009 | Marr et al. | |
| 2011/0062105 | A1 | 3/2011 | Itzek | |
| 2011/0121008 | A1 | 5/2011 | Lam | |
| 2012/0305581 | A1 | 12/2012 | Dunn et al. | |
| 2013/0068715 | A1 | 3/2013 | Sakulsacha | |
| 2013/0200031 | A1 | 8/2013 | Rees | |
| 2014/0291272 | A1 | 10/2014 | Weil | |
| 2016/0081884 | A1 | 3/2016 | Palmer et al. | |
| 2016/0090454 | A1 | 3/2016 | Kerns et al. | |
| 2018/0250199 | A1 | 9/2018 | Cudworth | |
| 2021/0085569 | A1 | 3/2021 | Li | |

FOREIGN PATENT DOCUMENTS

| | | | |
|---|---|---|---|
| CN | 1980626 | A | 6/2007 |
| CN | 101175463 | A | 5/2008 |
| CN | 103561711 | A | 2/2014 |
| EP | 1310230 | B1 | 5/2003 |
| EP | 2808006 | B1 | 3/2014 |
| GB | 2490735 | A | 11/2012 |
| GB | 2497590 | A | 6/2013 |
| GE | 2541883 | A | 8/2017 |
| JP | 2014166267 | A | 9/2014 |
| NZ | 524766 | A | 10/2004 |
| WO | WO 2002/22073 | A1 | 3/2002 |
| WO | WO 2006/103379 | A1 | 10/2006 |

OTHER PUBLICATIONS

International Preliminary Report on Patentability in International Appln. No. PCT/GB2022/052862, mailed on May 23, 2024, 8 pages.

International Preliminary Report on Patentability in International Appln. No. PCT/GB2022/052863, mailed on May 23, 2024, 7 pages.

International Search Report and Written Opinion in International Appln. No. PCT/GB2022/052862, mailed on Jan. 30, 2023, 9 pages.

International Search Report and Written Opinion in International Appln. No. PCT/GB2022/052863, mailed on Jan. 30, 2023, 8 pages.

International Search Report in International Appln. No. PCT/GB2016/052640, mailed Jan. 12, 2016, 7 pages.

Search Report in British Appln. No. GB1515376.0, mailed on Dec. 23, 2016, 2 pages.

* cited by examiner

NIPPLE AND NIPPLE ASSEMBLY

CROSS-REFERENCE TO RELATED APPLICATIONS

This application is a national stage application under 35 U.S.C. § 371 of PCT International Application No. PCT/GB2022/052863, filed Nov. 11, 2022, which claims the priority of Great Britain patent application number 2116379.5, filed with the UK Intellectual Property Office on Nov. 12, 2021. The entirety of the prior applications is incorporated herein by reference.

This invention relates generally to a nipple or a teat. More specifically, although not exclusively, this invention relates to a nipple for attachment to a container.

Nipples, or teats, simulate the operation of a breast to provide comfort, sustenance, or both, to an infant. In use, the nipple is inserted into the infant's mouth, and the infant suckles on the nipple. If the nipple is connected to a container, then sustenance (e.g. food or drink) inside of the container can be fed to the infant through the nipple. This technique is commonly known as bottle-feeding and aims to simulate breast-feeding. If the nipple is connected to a comforter, such as a soother (also known as a pacifier or dummy), then the infant is comforted by suckling on the soother in the same way that the infant might be comforted during breast-feeding.

Nipples generally have a base portion for connection to a container or comforter, a teat portion which, in normal use, fully enters the infant's mouth, and an areola portion located between the teat portion and the base portion. The infant will typically latch onto the areola portion such that the infant's lips form a seal around the areola portion.

A drawback of using a nipple to provide sustenance is that, if the infant's latch is suboptimal, or if the infant's lips become unsealed from the areola portion, then air may enter the infant's mouth. In turn, the infant may swallow the air which might cause discomfort, for example bloating, wind, reflux and/or colic. A further drawback of using a nipple to provide sustenance is that this can lead to the infant becoming less able to breastfeed, for example due to becoming less able to establish an effective latch on a breast. This is known as nipple confusion.

Nipple confusion and poor latching can be somewhat averted by ensuring optimal use of the nipple during bottle-feeding. During optimal bottle-feeding, the infant's lips seal around the areola portion of the nipple during latching, and the teat portion of the nipple abuts the roof of the infant's mouth. The infant then moves their bottom jaw back-and-forth, such that their tongue rubs against the teat portion and/or the areola portion. This back-and-forth movement of the lower jaw creates what is known, in the art, as stripping action. This optimal bottle-feeding resembles breast feeding, and so reduces the likelihood of the occurrence of nipple confusion and helps to maintain a secure latch around the areola portion.

However, maintaining optimal bottle-feeding is challenging because the bottle must be maintained in the correct orientation, relative to the infant, throughout. Often the person holding the bottle holds the bottle in a suboptimal orientation, or the bottle is moved out of the optimal orientation during the feed. This can lead to numerous negative effects, such as the teat portion moving away from the roof of the infant's mouth, as well as a poor latch around the areola portion, which may allow air into the infant's mouth whilst also causing nipple confusion.

A further drawback is that, in the optimal feeding orientation the bottle usually extends directly away from the infant's mouth. This means that the more that the infant is reclined during the feed, the more vertical the bottle becomes. In turn, this means that, due to the effect of gravity, the infant may suckle with less force to extract the contents of the bottle, especially when the bottle is full. This may also cause nipple confusion.

It would therefore be advantageous to provide a nipple which overcame at least some of the aforementioned drawbacks.

A broad aspect of the invention provides a nipple or teat, for example for use with an infant feeding or drinking vessel or comforter or nipple shield, the nipple comprising a radially offset latch portion having a region of reduced wall thickness.

The nipple may comprise a breast portion having a central region.

The latch portion may extend from the breast portion. The latch portion may comprise a teat portion and an areola portion. The latch portion may be radially offset from the central region of the breast portion. The latch portion may include an outer wall.

The outer wall of the latch portion may include a first region having a first wall thickness. The outer wall of the latch portion may include a second region having a second wall thickness. The second wall thickness may be less than the first wall thickness. The second region may be the region of reduced wall thickness.

According to an aspect of the invention, there is provided a nipple comprising:

- an breast portion having a central region; and
- a latch portion extending from the breast portion,
- wherein the latch portion is radially offset from the central region of the breast portion and includes an outer wall, and
- wherein the outer wall of the latch portion includes a first region having a first wall thickness and a second region having a second wall thickness, wherein the second wall thickness is less than the first wall thickness.

Advantageously, the arrangement of the latch portion improves the ability of an infant to form a latch on the nipple.

The second region may be provided on the teat portion. The second region may be on a radially-outer surface of the teat portion. The radially-outer surface of the teat portion may extend radially outwardly relative to the central region of the breast portion.

The teat portion may have a first end which is distal to the areola portion. The teat portion may have a second end which is proximal to the areola portion. The second region may be provided between the first end of the teat portion and the second end of the teat portion. The first end of the teat portion and the second end of the teat portion may define a first length therebetween.

The second region may have a first end which is distal to the areola portion. The second region may have a second end which is proximal to the areola portion. The first end of the second region and the second end of the second region may define a second length therebetween.

The second length of the second region may be less than the first length of the teat portion. The second length may be approximately two thirds of the first length. The second length may be more than a third of the first length. The second length may be less than three quarters of the first length.

The second region may include a recess or indentation or hollow or concave portion. The recess or indentation or hollow or concave portion may be provided on an inner surface of the teat portion.

The second region may have a periphery. The second region may define a tongue zone. The periphery may define a shape having a length or diameter or long axis and a width or diameter or short axis. The length or diameter or long axis of the periphery may correspond to the second length of the second region. The length or long axis of the periphery may be greater than the width or short axis of the periphery. The periphery may define a shape which is an oval or an ellipse or a circle. The periphery may define a shape which is a quadrilateral, for example a square or a rectangle. The periphery may define a gradual or progressive or continuous or sloped or ramped wall around the second region.

The tongue zone makes the nipple more realistic for an infant and further improves the infant's ability to form a latch around the nipple.

A first end of the periphery may correspond to the first end of the second region. The first end of the periphery may be spaced apart from the first end of the teat portion. The first end of the second region may be spaced apart from the first end of the teat portion.

A second end of the periphery may correspond to the second end of the second region. The second end of the periphery may be spaced apart from the second end of the teat portion. The second end of the second region may be spaced apart from the second end of the teat portion.

The first wall thickness may be less than 10 mm. The first wall thickness may be, for example, less than 8 mm. Preferably, the first wall thickness may be less than 6 mm. The first wall thickness may be at least 4 mm.

The second wall thickness may be less than 2 mm. Preferably the second wall thickness may be less than 1 mm. The second wall thickness may be at least 0.25 mm.

The ratio of the first wall thickness to the second wall thickness may be less than 7:1. The ratio of the first wall thickness to the second wall thickness may be more than 4:1. The ratio of the first wall thickness to the second wall thickness may be approximately 6:1.

At least a portion of the first region may extend radially inwardly relative to the central region of the breast portion. The portion of the first region which extends radially inwardly relative to the central region of the breast portion may be arcuate. The portion of the first region which extends radially inwardly relative to the central region of the breast portion may be generally convex.

The portion of the first region which extends radially inwardly relative to the central region of the breast portion may include at least a portion of the areola portion. The portion of the first region which extends radially inwardly relative to the central region of the breast portion may include at least a portion of the teat portion.

The breast portion may be generally dome-shaped. The latch portion may be generally frustoconical. The breast portion may have a first taper angle. The areola portion of the latch portion may have a second taper angle. The teat portion of the latch portion may have a third taper angle. The first taper angle, the second taper angle and the third taper angle may each be different. The taper angles may be defined relative to an axis of the breast portion. The axis may be referred to as a central axis.

The portion of the first region which extends radially inwardly relative to the central region of the breast portion may include at least one rib. The at least one rib may be formed on an inner surface of the portion of the first region which extends radially inwardly relative to the central region of the breast portion.

The portion of the first region which extends radially inwardly relative to the central region of the breast portion may have a first end which is proximal to the breast portion. The portion of the first region which extends radially inwardly relative to the central region of the breast portion may have a second end which is distal to the breast portion.

The central region of the portion of the first region which extends radially inwardly relative to the central region of the breast portion may be between the first end and the second end of the portion of the first region which extends radially inwardly relative to the central region of the breast portion.

The at least one rib may be provided in the central region of the portion of the first region which extends radially inwardly relative to the central region of the breast portion. The at least one rib may be provided on the areola portion. The at least one rib may be provided on the teat portion. The at least one rib may be generally straight. Alternatively, the at least one rib may be generally arcuate.

The portion of the first region which extends radially inwardly relative to the central region of the breast portion may include a plurality of ribs. One, some or all of the plurality of ribs may extend in a direction which is parallel to the direction in which another rib of the plurality of ribs extends. The plurality of ribs may be concentric or coaxial. One, some or each rib of the plurality of ribs may extend around a periphery of the teat portion. One, some or each rib of the plurality of ribs may be provided in the central region of the portion of the first region which extends radially inwardly relative to the central region of the breast portion. One, some or each rib of the plurality of ribs may be provided on the areola portion. One, some or each rib of the plurality of ribs may be provided on the teat portion.

One, some or each rib of the plurality of ribs may be generally straight. One, some or each rib of the plurality ribs may be generally arcuate.

The nipple may further comprise a base portion. The base portion may be connected to the areola portion of the latch portion via a recessed portion. The aforementioned taper angles may be with respect to an axis of the base portion. The axis may be referred to as a central axis.

According to a further aspect of the invention there is provided a nipple assembly for use with an infant drinking vessel, the nipple assembly including a nipple according to any of the previous aspects of the invention and a collar. The collar may be integrally formed with the nipple.

The collar may comprise an orifice for engaging the nipple. The collar may comprise an engagement portion configured for selective engagement with a container. The collar may be configured for removable engagement with a container. The collar may be configured so that the nipple assembly may be mounted to the mouth of a container. The collar may comprise a cover contacting portion for selectively mounting the assembly within a recessed volume of a cover. The collar may be configured so that the nipple assembly may be mounted within a recessed volume of a cover.

According to another aspect of the invention there is provided an infant feeding assembly for use with an infant drinking vessel, the infant feeding assembly including a nipple according to the previous aspects of the invention and a vessel or container or bottle.

The infant feeding assembly may further comprise a collar which is configured to secure the nipple to the vessel or container or bottle. The collar may be integrally formed with the nipple.

The collar may comprise an orifice for engaging the nipple. The collar may comprise an engagement portion configured for selective engagement with a container. The collar may be configured for removable engagement with a container. The collar may be configured so that the nipple assembly may be mounted to the mouth of a container. The collar may comprise a cover contacting portion for selectively mounting the assembly within a recessed volume of a cover. The collar may be configured so that the nipple assembly may be mounted within a recessed volume of a cover.

According to a yet further aspect of the invention there is provided a comforter assembly for comforting an infant, the comforter assembly including a nipple according to the previous aspects of the invention.

According to an alternative aspect of the invention there is provided a nipple shield including a nipple according to the previous aspects of the invention.

For the avoidance of doubt, any of the features described herein apply equally to any aspect of the invention. For example, the nipple and/or infant feeding assembly may comprise any one or more features of the nipple and/or the method may comprise any one or more features or steps relevant to one or more features of the nipple or the nipple assembly or the infant feeding assembly.

Another aspect of the invention provides a computer program element comprising and/or describing and/or defining a three-dimensional design, e.g. of the nipple described above or an embodiment thereof. The three-dimensional design may be for use with a simulation means or an additive or subtractive manufacturing means, system or device.

The computer program element may be for causing, or operable or configured to cause, an additive or subtractive manufacturing means, system or device to manufacture the nipple described above or an embodiment thereof. The computer program element may comprise computer readable program code means for causing an additive or subtractive manufacturing means, system or device to execute a procedure to manufacture the nipple described above or an embodiment thereof.

A yet further aspect of the invention provides the computer program element embodied on a computer readable medium.

A yet further aspect of the invention provides a control means or control system or controller comprising the aforementioned computer program element or computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms “may”, “and/or”, “e.g.”, “for example” and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Non-limiting examples of the invention will now be described with reference to the accompanying drawings in which.

Figure 1:
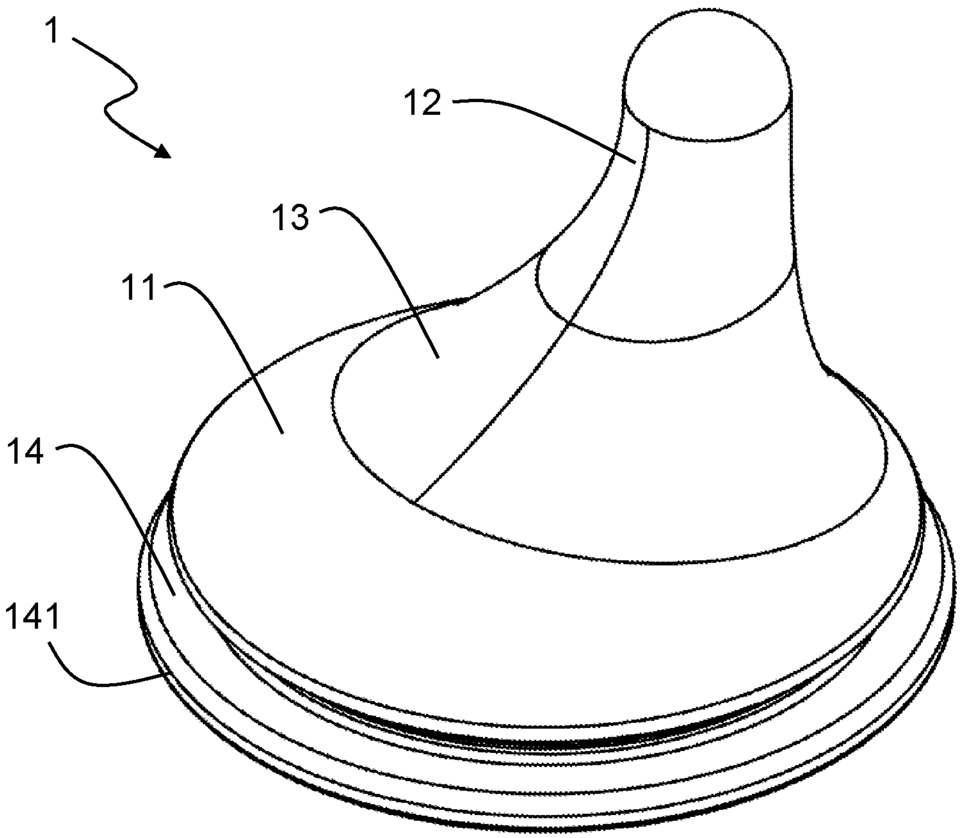
FIG. 1 is an isometric view of a nipple.
Figure 2:
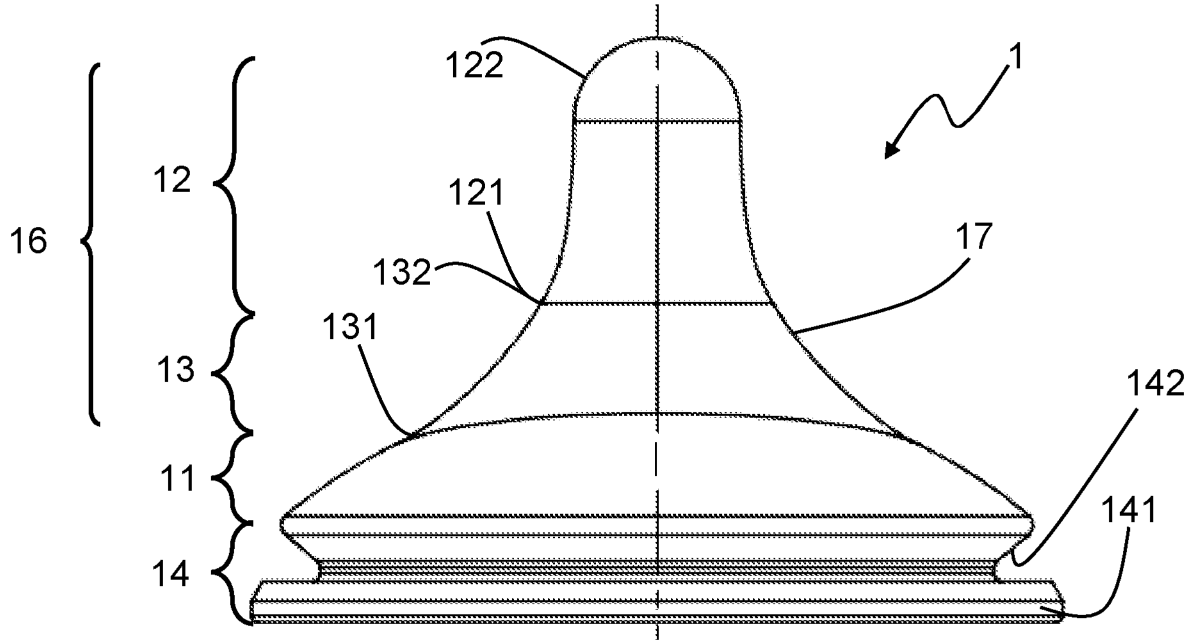
FIG. 2 is a rear view of the nipple of FIG. 1.
Figure 3:
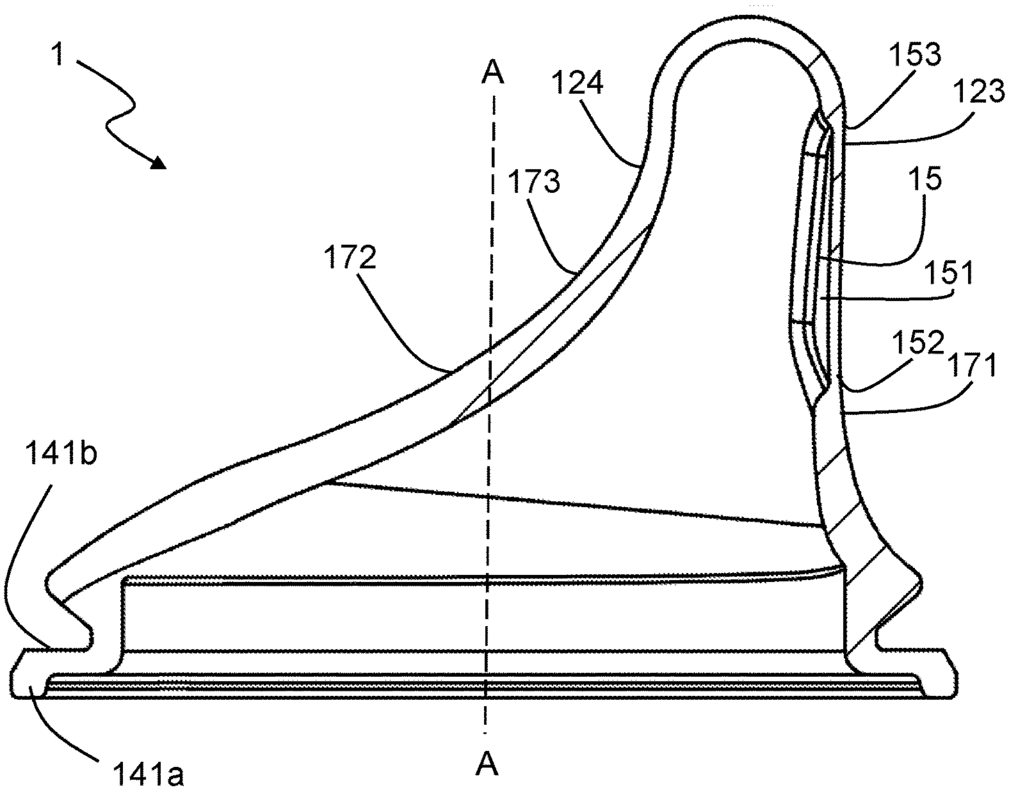
FIG. 3 is a side section view of the nipple of FIG. 1.

Referring now to FIGS. 1, 2 and 3 there is shown a nipple 1 (which may also be referred to as a “teat”). The nipple 1 has a breast portion 11, a teat portion 12 and an areola portion 13. The areola portion 13 is located between the teat portion 12 and the breast portion 11. The teat portion 12 and areola portion 13 are collectively referred to, herein, as a latch portion 16. The nipple 1 has a base portion 14, which in this example is for connection to a container (not shown). However, it will be appreciated that the base portion 14 may be configured for connection to other external components such as comforters, for example soothers, dummies or pacifiers, or teethers or teething toys, or nipple shields or guards. The breast portion 11 is located between the areola portion 13 of the latch portion and the base portion 14. The base portion 14, breast portion 11 and latch portion 16 have a continuous, or progressive, outer wall 17. Throughout the description reference is made to “upper”, “upwardly”, “lower” and “downwardly”, and these terms relate to the orientation of the nipple 1 when located on a container (not shown), such that the nipple 1 is located at the top of the container.

The base portion 14 has a sealing ring 141 which is located at a lower end of the nipple 1. The sealing ring 141 has a peripheral lip 141*a* (as shown in FIG. 3) at the lower end, for sealing around an opening of the container, in use. The sealing ring 141 has a flat upper surface 141*b* for abutment of a securing ring (not shown) thereagainst. The base portion 14 has a tapered section 142 extending upwardly and outwardly from an innermost edge of the flat upper surface 141*b*, to define a circumferential groove in the base portion 14.

The breast portion 11 extends inwardly and upwardly from an upper edge of the tapered section 142. In this example the breast portion 11 is dome shaped, thereby having a central region around a central axis of the base portion 14.

The latch portion 16 extends upwardly from the breast portion 11. The latch portion is radially offset from the central region of the breast portion 11. That is, the latch portion extends from a position on the breast portion 11 which is radially offset from the central axis A-A (as shown in FIG. 3) of the base portion 14. The areola portion 13 of the latch portion 16 has a lower end 131 which is continuous with the breast portion 11, and an upper end 132 which is continuous with the teat portion 12. The areola portion 13 has a substantially circular cross-section at both the upper end 132 and the lower end 131. The cross-sectional diameter at the lower end 131 is larger than that at the upper end 132. The centre of the cross-section of the lower end 131 is radially offset from the central axis A-A of the base portion 14, in the same direction as the radial offset of the latch portion 16 from the breast portion 11. The centre of the cross-section of the upper end 132 is radially offset from the centre of the cross-section of the lower end 131, in the same direction as the radial offset of the latch portion 16 from the breast portion 11. The outer wall 17 of the areola portion 13, at a radially outer portion 171 with respect to the axis A-A of the base portion 14, is substantially parallel with the axis of the base portion 14. The outer wall of the areola portion 13, at a radially inner position 172 with respect to the axis A-A of the base portion 14, is curved to connect the upper end 132 and the lower end 131 of the areola portion 13, the curve having a radius such that the inner position of the outer wall of the areola portion 13 is substantially tangential to the outer wall of the breast portion 11 at the lower end, and substantially tangential with the outer wall of the teat portion 12 at the upper end. The cross-section of the areola portion 13 is substantially circular along the length of the areola portion 13, and the diameter reduces in the direction from the lower end 131 to the upper end 132. The teat portion 12 of the latch portion has a lower end 121 which has the same diameter as the upper end 132 of the areola portion 13. The teat portion 12 has a substantially partial-spherically, or substantially hemispherically, shaped upper end 122 to close the teat portion 12. The diameter of the upper end 122 is less than the cross-sectional diameter of the lower end 121 of the teat portion 12. The outer wall of the teat portion 12, at a radially outer portion 123 with respect to the axis A-A of the base portion 14, is substantially parallel with the axis of the base portion 14. The outer wall of the teat portion 12, at a radially inner position 124 with respect to the axis A-A of the base portion 14, is curved to connect the upper end 122 and the lower end 121 of the teat portion 12, the curve having a radius such that the inner position of the outer wall of the teat portion 12 is substantially tangential to the outer wall of the areola portion 13 at the lower end, and is substantially parallel with the axis of the base portion 14 proximal to the upper end. The cross-section of the teat portion 12 is substantially circular along the length of the teat portion 12, and the diameter reduces in the direction from the lower end 121 to the upper end 122.

With particular reference now to FIG. 3, a side section view of the nipple 1 is shown. The outer wall 17 of the latch portion 16 has a first region 173 having a first wall thickness. The outer wall 17 of the latch portion 16 has a second region 15 having a second wall thickness which is less than the first wall thickness. The second region 15 is located on an inner surface of the outer wall 17 of the latch portion 16. The second region 15 is located at a radially-outer portion of the outer wall 17, with respect to the axis A-A of the base portion 14. That is, a centreline of the second region 15 is located along the radially outer portion of the outer wall 17 of the areola portion 13 and the teat portion 12. The second region 15 is formed by a recess 151 on the inner surface of the outer wall 17. The second region 15 extends along the outer wall 17 in a direction which is generally parallel to the axis A-A of the base portion 14, from a lower position 152 which is adjacent to, but spaced apart from, the upper part 132 of the areola portion 13, to an upper position 153 which is adjacent to, but spaced apart from, the upper end 122 of the teat portion 12. The second region 15 extends circumferentially around the latch portion, away from the radially outer portion 171 of the outer wall 17 of the areola portion 13 and the teat portion 12. The second region 15 is symmetric about the radially outer portion of the outer wall of the areola portion 13 and the teat portion 12.

In this example, the outer wall of the breast portion 11 and of the first region 172 of the latch portion 16 are of substantially uniform thickness. In this example, the outer wall of the breast portion 11 and of the first region 172 of the latch portion is 5 mm thick, but it will be appreciated that other suitable thicknesses are envisaged. The outer wall of the recess 151 of the second region 15 of the latch portion, in this example, is 0.75 mm thick, but it will be appreciated that other suitable thicknesses are envisaged.

In this example, the nipple 1 is manufactured using silicone with a shore hardness of between 30A and 50A. It will be apparent to the skilled person that the hardness of the silicone and the thicknesses of the outer wall, may be altered to provide a nipple 1 with a desired amount of flexibility. The nipple 1 can be formed in any appropriate manner, for example compression or injection moulding and formed of any appropriate elastic material such as silicone, latex or thermoplastic elastomer (TPE). Injection moulded silicone provides a particularly desirable degree of elasticity in the latch portion.

In use, the latch portion of the nipple 1 is inserted into an infant's mouth. The nipple 1 is oriented such that the region of the latch portion having a reduced thickness, second region 15, is adjacent the infant's lower jaw and the opposite surface of the latch portion is adjacent the infant's upper jaw. The infant's lips latch to the latch portion at the areola portion 13, thereby forming a seal around the nipple 1.

The infant's tongue contacts the region of the latch portion having a reduced thickness. As the infant sucks on the nipple 1, the tongue moves in a peristaltic or wave-like motion up and down the second region 15. This movement, which is also known as a stripping action, encourages the flow of sustenance through the nipple 1 and into the infant's mouth. Without wishing to be bound by any theory, it is thought that the region of reduced thickness 15 moves and stretches in the way that is akin to the way a nursing mother's skin would move and stretch during breast-feeding, thereby providing a more natural feel during bottle-feeding.

As the infant's upper lip presses into the region opposite second region 15, the teat portion 12 is caused to bend upwards (away from the second region 15) towards the roof of the infant's mouth. This advantageously contributes to the more natural feel experienced during bottle-feeding.

The progressive or continuous surface between the breast portion 11, the areola portion 13 and the teat portion 12 further advantageously improves the infant's latch around the nipple 1 during feeding.

Figure 4:
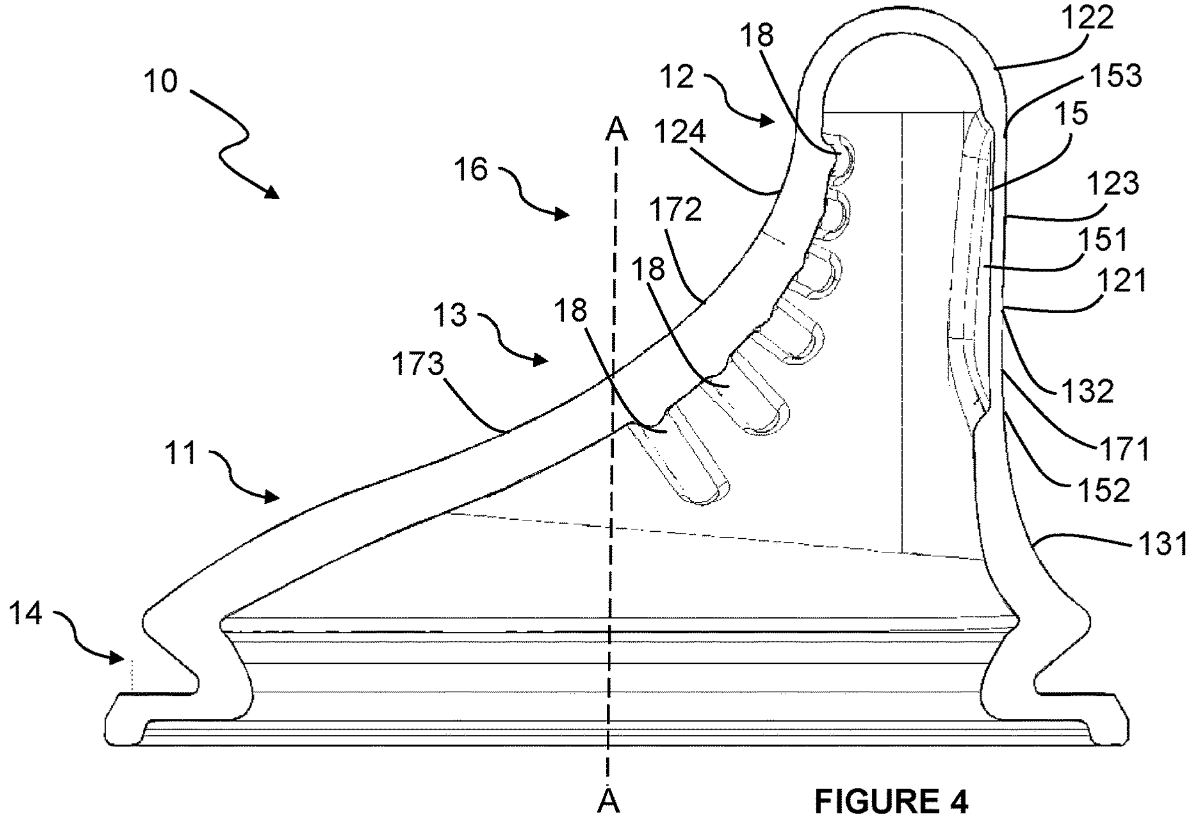
FIG. 4 is a side section view of a nipple according to another example.
Figure 5:
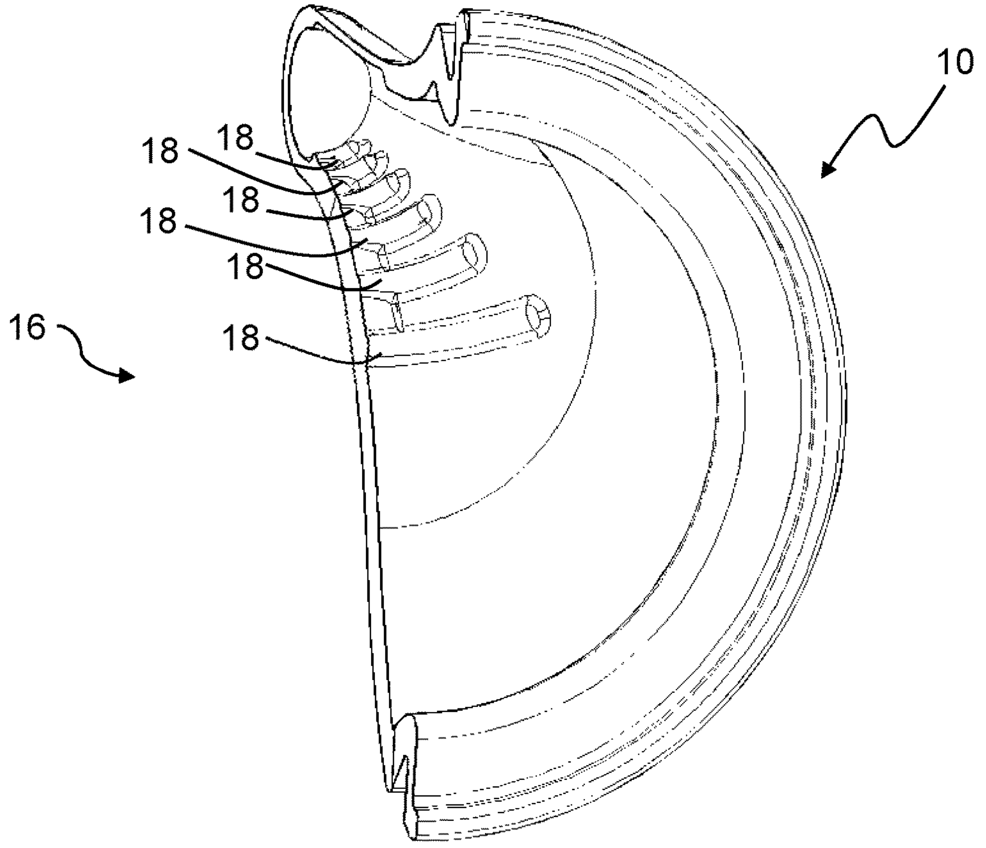
FIG. 5 is a underneath section view of the nipple of FIG. 4.
Figure 6:
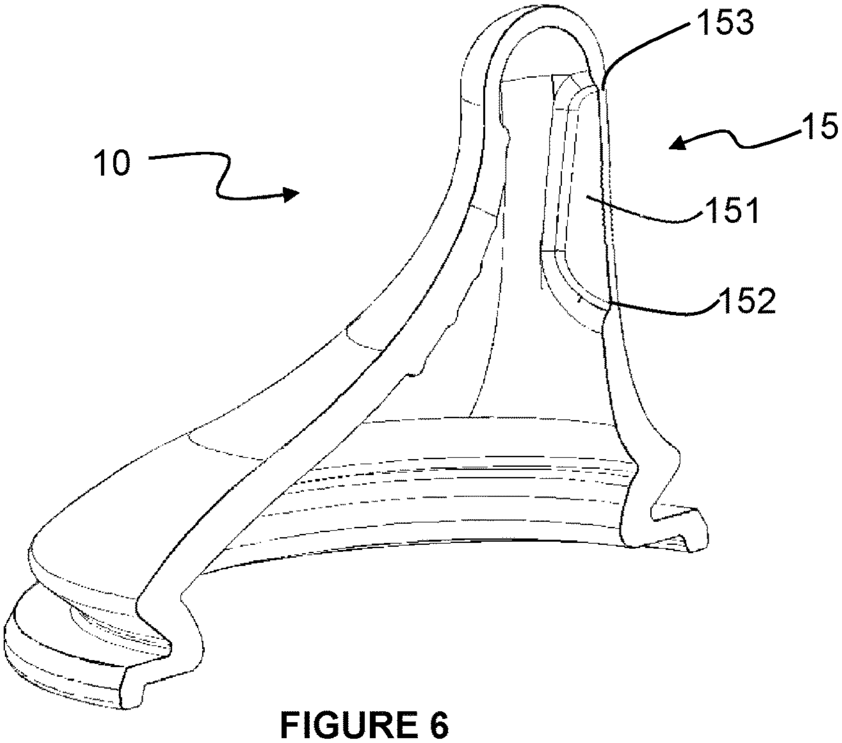
FIG. 6 is a rearward section view of the nipple of FIG. 4

Another example of the invention will now be described with reference to FIGS. 4 to 6. Like features are depicted with like reference numerals.

The nipple, or teat, 10 of this example also has a breast portion 11, a teat portion 12 and an areola portion 13. The areola portion 13 is located between the teat portion 12 and the breast portion 11. The teat portion 12 and areola portion 13 are collectively referred to, herein, as a latch portion 16. The nipple 10 has a base portion 14, which in this example is configured for connection to a container (not shown). As with the previous example, it will be appreciated that the base portion 14 may be configured for connection to other external components such as comforters, for example soothers, dummies or pacifiers, or teethers or teething toys, or nipple shields or guards. The breast portion 11 is located between the areola portion 13 of the latch portion and the base portion 14. The base portion 14, breast portion 11 and latch portion 16 have a continuous, or progressive, outer wall 17. Throughout the description reference is made to "upper", "upwardly", "lower" and "downwardly", and these terms relate to the orientation of the nipple 10 when located on a container (not shown), such that the nipple 10 is located at the top of the container.

The base portion 14 has a sealing ring 141 which is located at a lower end of the nipple 10. The sealing ring 141 has a peripheral lip 141*a* (as described with reference to FIG. 3) at the lower end, for sealing around an opening of the container, in use. The sealing ring 141 has a flat upper surface 141*b* for abutment of a securing ring (not shown) thereagainst. The base portion 14 has a tapered section 142 extending upwardly and outwardly from an innermost edge of the flat upper surface 141*b*, to define a circumferential groove in the base portion 14.

The breast portion 11 extends inwardly and upwardly from an upper edge of the tapered section 142. In this example the breast portion 11 is also dome shaped, thereby having a central region around a central axis A-A of the base portion 14.

The latch portion 16 extends upwardly from the breast portion 11. The latch portion is radially offset from the central region of the breast portion 11. That is, the latch portion extends from a position on the breast portion 11 which is radially offset from the central axis A-A (as shown in FIG. 4) of the base portion 14. The areola portion 13 of the latch portion 16 has a lower end 131 which is continuous with the breast portion 11, and an upper end 132 which is continuous with the teat portion 12. The areola portion 13 has a substantially circular cross-section at both the upper end 132 and the lower end 131. The cross-sectional diameter at the lower end 131 is larger than that at the upper end 132. The centre of the cross-section of the lower end 131 is radially offset from the central axis A-A of the base portion 14, in the same direction as the radial offset of the latch portion 16 from the breast portion 11. The centre of the cross-section of the upper end 132 is radially offset from the centre of the cross-section of the lower end 131, in the same direction as the radial offset of the latch portion 16 from the breast portion 11. The outer wall 17 of the areola portion 13, at a radially outer portion 171 with respect to the axis A-A of the base portion 14, is substantially parallel with the axis of the base portion 14. The outer wall of the areola portion 13, at a radially inner position 172 with respect to the axis A-A of the base portion 14, is curved to connect the upper end 132 and the lower end 131 of the areola portion 13, the curve having a radius such that the inner position of the outer wall of the areola portion 13 is substantially tangential to the outer wall of the breast portion 11 at the lower end, and substantially tangential with the outer wall of the teat portion 12 at the upper end. The cross-section of the areola portion 13 is substantially circular along the length of the areola portion 13, and the diameter reduces in the direction from the lower end 131 to the upper end 132. The teat portion 12 of the latch portion has a lower end 121 which has the same diameter as the upper end 132 of the areola portion 13. The teat portion 12 has a substantially partial-spherically, or substantially hemispherically, shaped upper end 122 to close the teat portion 12. The diameter of the upper end 122 is less than the cross-sectional diameter of the lower end 121 of the teat portion 12. The outer wall of the teat portion 12, at a radially outer portion 123 with respect to the axis A-A of the base portion 14, is substantially parallel with the axis of the base portion 14. The outer wall of the teat portion 12, at a radially inner position 124 with respect to the axis A-A of the base portion 14, is curved to connect the upper end 122 and the lower end 121 of the teat portion 12, the curve having a radius such that the inner position of the outer wall of the teat portion 12 is substantially tangential to the outer wall of the areola portion 13 at the lower end, and is substantially parallel with the axis of the base portion 14 proximal to the upper end. The cross-section of the teat portion 12 is substantially circular along the length of the teat portion 12, and the diameter reduces in the direction from the lower end 121 to the upper end 122.

As described in relation to the first example of a nipple 1, the outer wall 17 of the latch portion 16 of the nipple 10 has a first region 173 having a first wall thickness. The outer wall 17 of the latch portion 16 has a second region 15 having a second wall thickness which is less than the first wall thickness. The second region 15 is located on an inner surface of the outer wall 17 of the latch portion 16. The second region 15 is located at a radially-outer portion of the outer wall 17, with respect to the axis A-A of the base portion 14. That is, a centreline of the second region 15 is located along the radially outer portion of the outer wall 17 of the areola portion 13 and the teat portion 12. The second region 15 is formed by a recess 151 on the inner surface of the outer wall 17. The second region 15 extends along the outer wall 17 in a direction which is generally parallel to the axis A-A of the base portion 14, from a lower position 152 which is adjacent to, but spaced apart from, the upper part 132 of the areola portion 13, to an upper position 153 which is adjacent to, but spaced apart from, the upper end 122 of the teat portion 12. The second region 15 extends circumferentially around the latch portion, away from the radially outer portion 171 of the outer wall 17 of the areola portion 13 and the teat portion 12. The second region 15 is symmetric about the radially outer portion of the outer wall of the areola portion 13 and the teat portion 12.

In this example, the outer wall of the breast portion 11 and of the first region 172 of the latch portion 16 are not of substantially uniform thickness. In this example, the outer wall of the breast portion 11 is 5 mm thick, but it will be appreciated that other suitable thicknesses are envisaged. The first region 172 of the latch portion 16 has localised regions having a greater thickness than the thickness of the outer wall of the breast portion 11. The localised regions are in the form of ribs 18. The ribs 18 are formed on an inner surface of the outer wall and extend around the periphery of the wall. In the example shown, there are six ribs 18. Some of the ribs 18 are provided in the teat portion 12. Some of the ribs 18 are provided in the areola portion 13. It will be understood that one, some or all of the ribs 18 may be provided on the areola portion 13. Similarly, one, some or all of the ribs 18 may be provided on the teat portion 12. It will also be understood that, in other examples of the invention, any number of ribs 18 may be provided.

As with the first example of the invention, the outer wall of the recess 151 of the second region 15 of the latch portion, in this example, is 0.75 mm thick, but it will be appreciated that other suitable thicknesses are envisaged.

In this example, the nipple 10 is manufactured using silicone with a shore hardness of between 30A and 50A. It will be apparent to the skilled person that the hardness of the silicone and the thicknesses of the outer wall, may be altered to provide a nipple 10 with a desired amount of flexibility. The nipple 10 can be formed in any appropriate manner, for example compression or injection moulding and formed of any appropriate elastic material such as silicone, latex or thermoplastic elastomer (TPE). Injection moulded silicone provides a particularly desirable degree of elasticity in the latch portion.

In use, the latch portion of the nipple 10 is inserted into an infant's mouth. The nipple 10 is oriented such that the region of the latch portion having a reduced thickness, second region 15, is adjacent the infant's lower jaw and the opposite surface of the latch portion is adjacent the infant's upper jaw. The infant's lips latch to the latch portion at the areola portion 13, thereby forming a seal around the nipple 10.

The infant's tongue contacts the region of the latch portion having a reduced thickness. As the infant sucks on the nipple 10, the tongue moves in a peristaltic or wave-like motion up and down the second region 15. This movement, which is also known as a stripping action, encourages the flow of sustenance through the nipple 10 and into the infant's mouth. Without wishing to be bound by any theory, it is thought that the region of reduced thickness 15 moves and stretches in the way that is akin to the way a nursing mother's skin would move and stretch during breast-feeding, thereby providing a more natural feel during bottle-feeding.

As the infant's upper lip presses into the region opposite second region 15, the teat portion 12 is caused to bend upwards (away from the second region 15) towards the roof of the infant's mouth. The spine-like ribs 18 advantageously aid the bending movement of the teat portion 12. This advantageously contributes to the more natural feel experienced during bottle-feeding.

The progressive or continuous surface between the breast portion 11, the areola portion 13 and the teat portion 12 further advantageously improves the infant's latch around the nipple 10 during feeding.

Figure 7:
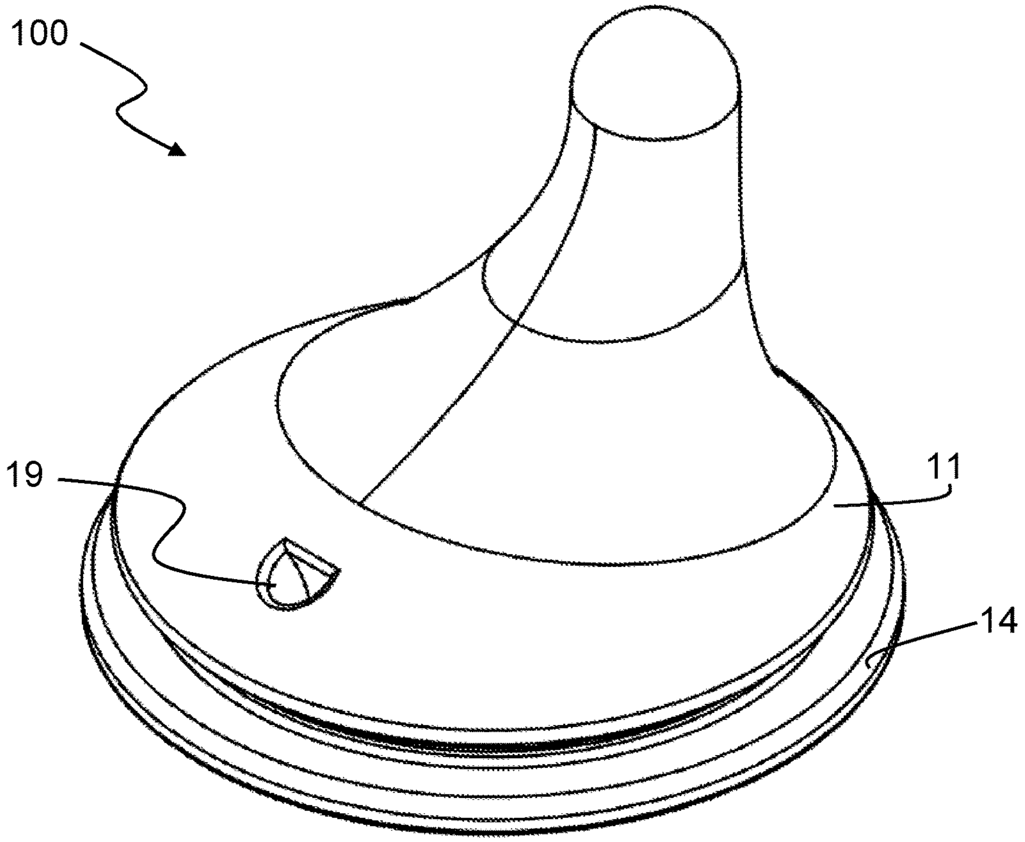
FIG. 7 is an isometric view of a nipple according to another example.
Figure 8:
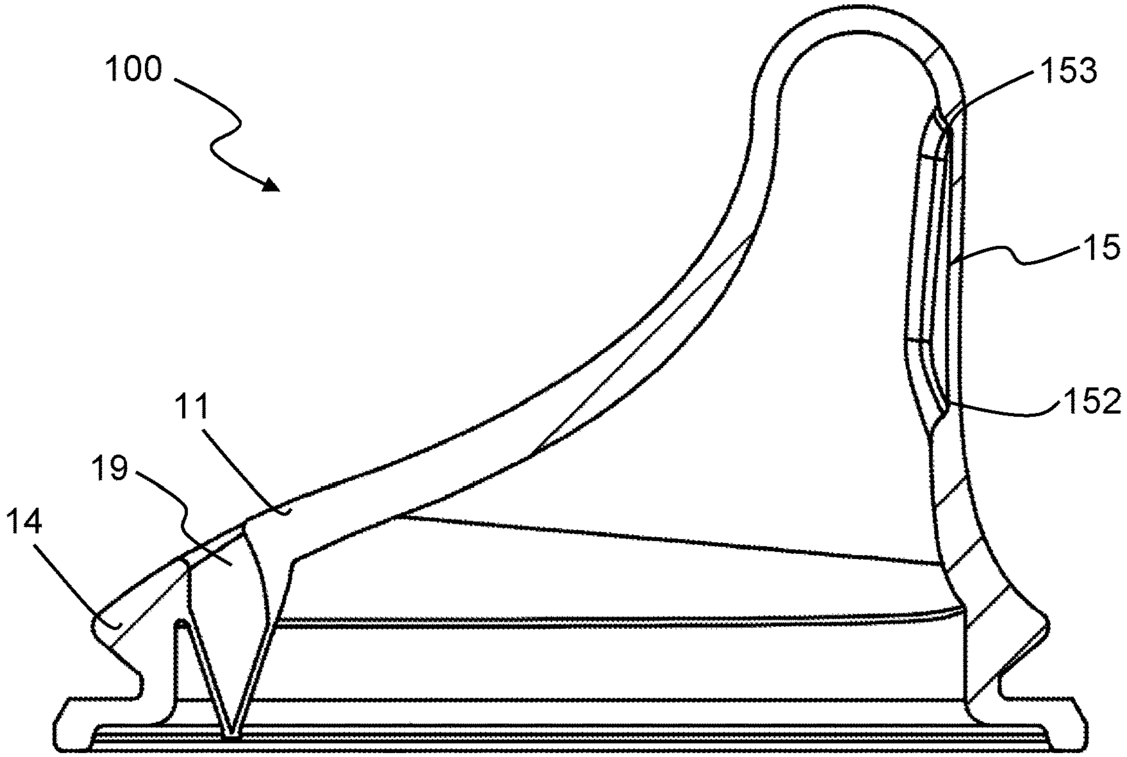
FIG. 8 is a side section view of the nipple of FIG. 7.

Another example of a nipple 100 according to the invention is shown in FIGS. 7 and 8. Like features are depicted with like reference numerals and will not be described further.

The nipple 100 of this example is similar to the nipple 1 of the first example, but includes a vent 19. It will be understood that the nipple 10 of the second example may also include a vent 19.

The vent 19 extends between an opening in the breast portion 11 into the base portion 14. The vent 19 allows for better airflow, helping to prevent the infant ingesting excess air and getting pains, or colic.

It will be appreciated by those skilled in the art that several variations to the aforementioned embodiments are envisaged without departing from the scope of the invention. For example, nipples according to the invention may be manufactured from any suitable material.

In the embodiments described above, the nipples 1, 10 are formed in any appropriate manner, for example compression or injection moulding and formed of any appropriate elastic material such as silicone, latex or thermoplastic elastomer (TPE). It will be understood that nipples according to the invention could be made using any suitable method. The method may be an additive manufacturing method.

In the embodiments described above, the outer wall of the nipple 1, 10 is approximately 5 mm thick and the region 15 of reduced thickness has a thickness of approximately 0.75 mm. It will be understood that alternative wall thicknesses may be used without departing from the scope of the invention. Alternative wall thicknesses may, for example, be used with different materials and materials having different hardness and/or elasticity properties.

It will also be appreciated by those skilled in the art that any number of combinations of the aforementioned features and/or those shown in the appended drawings provide clear advantages over the prior art and are therefore within the scope of the invention described herein.

The invention claimed is:

1. A nipple comprising:

a breast portion having a central region; and a latch portion extending from the breast portion, the latch portion comprising a teat portion and an areola portion;

wherein the latch portion is radially offset from the central region of the breast portion and includes an outer wall;

wherein the outer wall of the latch portion includes a first region having a first wall thickness and a second region having a second wall thickness, wherein the second wall thickness is less than the first wall thickness; and wherein the teat portion has a first end which is distal to the areola portion and a second end which is proximal to the areola portion, wherein the second region is provided between the first end of the teat portion and the second end of the teat portion; and wherein the first end of the teat portion and the second end of the teat portion define a first length therebetween and the second region has a second length, wherein the second length is less than the first length.

2. A nipple according to claim 1, wherein the second region is provided on the teat portion.

3. A nipple according to claim 2, wherein the second region is on a radially-outer surface of the teat portion.

4. A nipple according to claim 3, wherein the radially-outer surface of the teat portion extends radially outwardly relative to the central region of the breast portion.

5. A nipple according to claim 1, wherein the second length is approximately two thirds of the first length.

6. A nipple according to claim 1, wherein the second region includes a recess.

7. A nipple according to claim 6, wherein the recess is provided on an inner surface of the teat portion.

8. A nipple according to claim 1, wherein the second region has a periphery.

9. A nipple according to claim 8, wherein a first end of the periphery is spaced apart from the first end of the teat portion.

10. A nipple according to claim 9, wherein a second end of the periphery is spaced apart from the second end of the teat portion.

11. A nipple according to claim 1 wherein the ratio of the first wall thickness to the second wall thickness is approximately 6:1.

12. A nipple according to claim 1, wherein at least a portion of the first region extends radially inwardly relative to the central region of the breast portion.

13. A nipple according to claim 12, wherein the portion of the first region which extends radially inwardly relative to the central region of the breast portion is generally convex.

14. A nipple according to claim 12, wherein the portion of the first region which extends radially inwardly relative to the central region of the breast portion includes at least one rib.

15. A nipple according to claim 14, wherein the at least one rib is formed on an inner surface of the portion of the first region which extends radially inwardly relative to the central region of the breast portion.

16. A nipple according to claim 14, wherein the at least one rib extends around a periphery of the teat portion.

17. A nipple according to claim 14, wherein the portion of the first region which extends radially inwardly relative to the central region of the breast portion includes a plurality of ribs.

18. A nipple according to claim 17, wherein one or some of the plurality of ribs are provided on the areola portion.

19. A nipple according to claim 17, wherein one or some of the plurality of ribs are provided on the teat portion.

20. A nipple assembly for use with an infant drinking vessel, the nipple assembly comprising a nipple according to claim 1 and a collar.

21. A feeding assembly for use with an infant drinking vessel, the feeding assembly comprising a nipple according to claim 1 and a container.

22. A feeding assembly according to claim 21, the feeding assembly further comprising a collar for securing the nipple to the container.

23. A comforter assembly for comforting an infant, the comforter assembly comprising a nipple according to claim 1.

* * * * *